United States Patent
Wu

(10) Patent No.: US 6,396,501 B1
(45) Date of Patent: May 28, 2002

(54) MEMORY ARRANGEMENT FOR EXPOSURE DATA USED IN MULTIPLE EXPOSURES AND METHOD FOR PROCESSING MULTIPLE EXPOSURES

(75) Inventor: Heng-Chen Wu, Taipei (TW)

(73) Assignee: Aetas Technology Corporation, Irvine, CA (US)

( * ) Notice: Subject to any disclaimer, the term of this patent is extended or adjusted under 35 U.S.C. 154(b) by 0 days.

(21) Appl. No.: 09/243,081

(22) Filed: Feb. 2, 1999

(30) Foreign Application Priority Data

Feb. 25, 1998 (TW) ........................................ 87102752 A

(51) Int. Cl.[7] ................................................ G06T 1/60
(52) U.S. Cl. ...................... 345/530; 345/536; 355/40; 355/77; 358/1.9
(58) Field of Search ................................. 345/508, 507, 345/510, 520, 521, 537, 530, 536; 355/40, 77; 358/1.9, 1.16, 1.17

(56) References Cited

U.S. PATENT DOCUMENTS 5,493,322 A * 2/1996 Ng et al. ................... 347/240
5,581,295 A * 12/1996 Prowak ...................... 347/237

* cited by examiner

Primary Examiner—Mark Zimmerman
Assistant Examiner—Mackly Monestime
(74) Attorney, Agent, or Firm—BakerBotts, LLP

(57) ABSTRACT

A memory aarrangement for exposure data used in multiple exposures stores gray level data which include a high bit portion and a low bit portion. The memory arrangement includes a first memory for storing the high bit portion of the gray level data and a second memory for storing the low bit portion of the gray level data. The first memory and the second memory can be controlled by separate chip selection control signals. Further, the memories are provided with two separate byte enable signals, respectively, to control accesses to a high byte and a low byte in each memory unit. In writing, the gray level data are written in an interleaving manner to avoid conflicts between data lines. In reading, the high byte and the low byte which are interleaved are exchanged before they are read out.

23 Claims, 8 Drawing Sheets

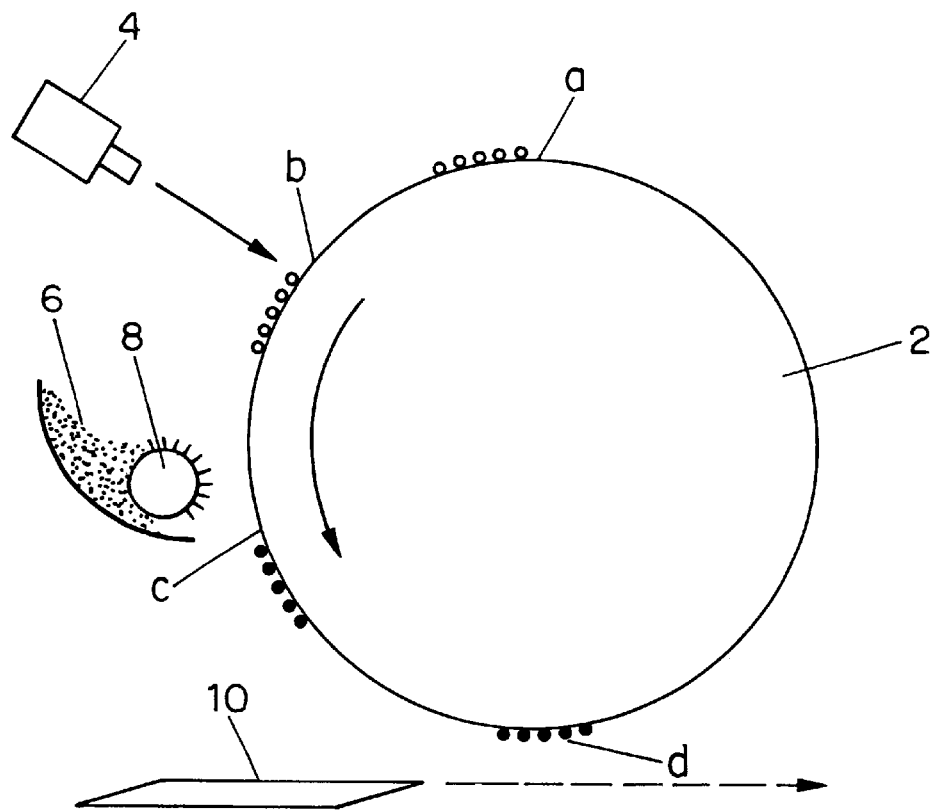
PRIOR ART  FIG. 1
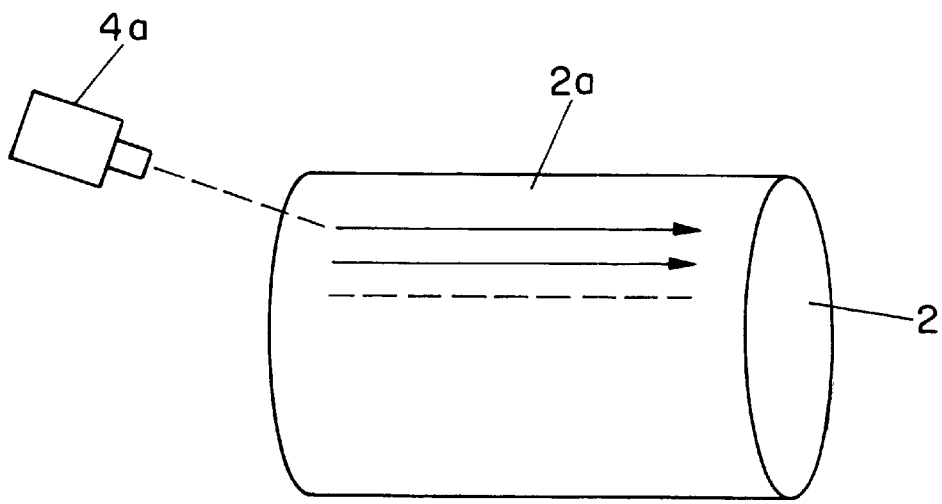
PRIOR ART  FIG. 2

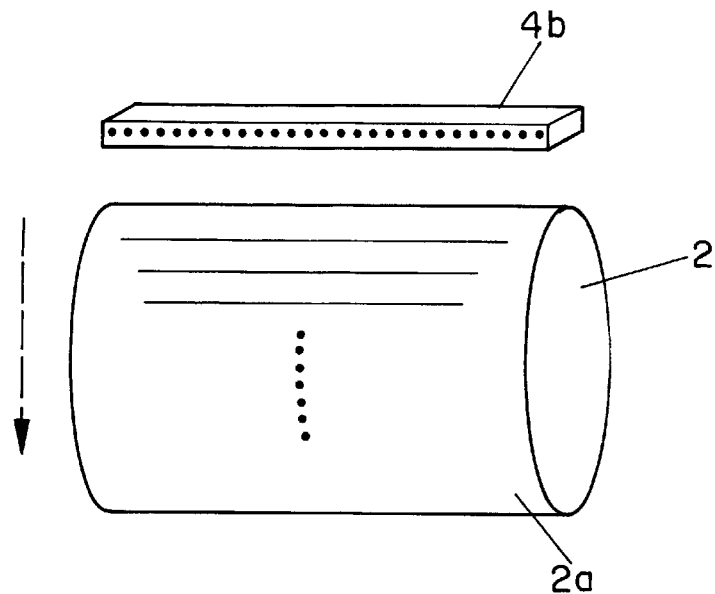
PRIOR ART  FIG. 3
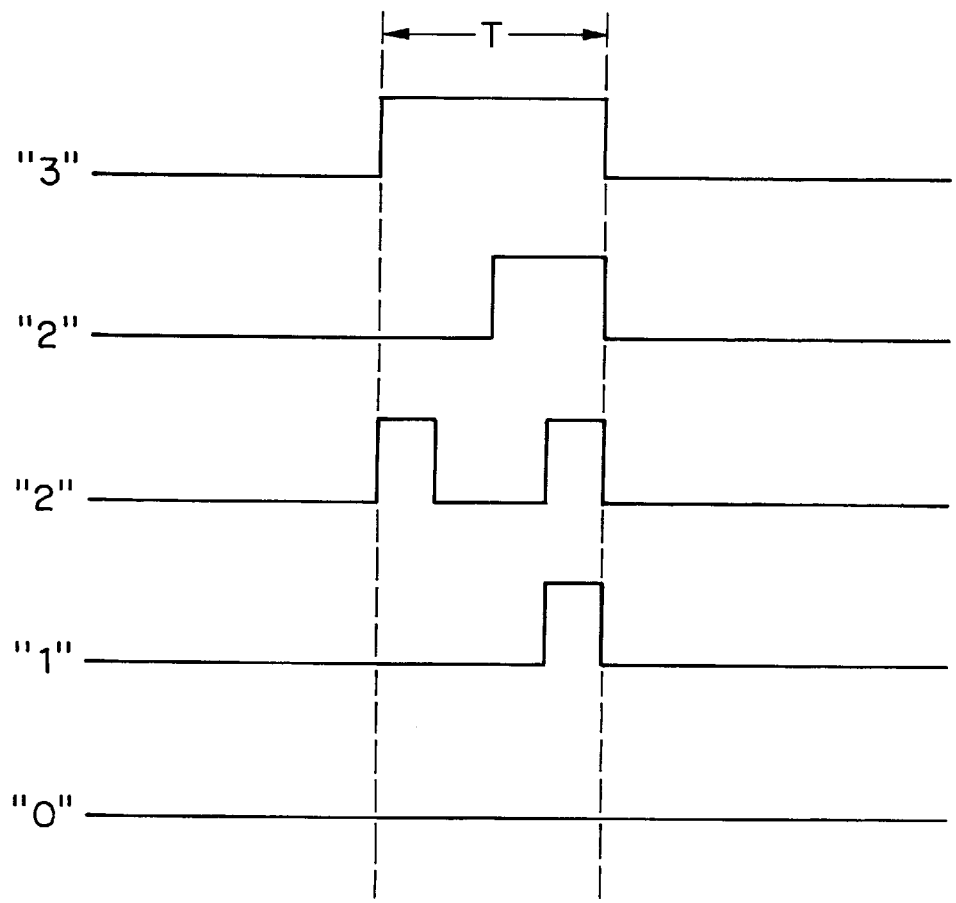
PRIOR ART  FIG. 4

MEMORY ARRANGEMENT FOR EXPOSURE DATA USED IN MULTIPLE EXPOSURES AND METHOD FOR PROCESSING MULTIPLE EXPOSURES

BACKGROUND OF THE INVENTION

The present invention relates to electrophotographic exposure methods and arrangements. More particularly, the present invention relates to a memory arrangement for exposure data used in multiple exposures with gray levels and a method for processing the exposures carried out using the memory arrangement.

An electrophotographic arrangement such as a copying machine or a laser printer carries out printing by electrostatically attracting toner onto a paper sheet. FIG. 1 is a schematic view showing a general electrophotographic arrangement. The arrangement shown in FIG. 1 includes a photoreceptor drum 2, an image exposure light source 4, a toner cartridge 6 and a developer roll 8, producing a toner image which is transferred onto a paper sheet 10. The electrophotographic arrangement also includes additional optical and mechanical elements which are omitted in FIG. 1 for clarity.

In the arrangement shown in FIG. 1, toner is attracted to the photoreceptor drum 2 by an electrostatic force and is then transferred onto the paper sheet 10 to be printed. The photoreceptor drum 2 has a surface layer consisting of a photosensitive material which generates electron/hole pairs under illumination of light of a specified wavelength. During a printing operation, the photoreceptor drum 2 is rotated counterclockwise as shown in FIG. 1. As the photoreceptor drum 2 rotates, operations of charging, exposure, development, transfer, fusing, cleaning and erasure are sequentially carried out. These operations will be described with reference to the positions a, b, c and d on the photoreceptor drum 2 in FIG. 1.

First, at the position a, electrostatic charges are uniformly applied to a surface of the photoreceptor drum 2 by a high voltage. At the position b, a light beam from the exposure light source 4 illuminates the electrostatic charge in the regions on the surface of the photoreceptor drum 2 according to the image to the printed. Since the light from the exposure light source 4 eliminates the electrostatic charges which are illuminated, a latent image is formed, and thus the charge distribution is no longer uniform but corresponds to the image to be printed. At the position c, toner is attracted from the sleeve 8 in the toner cartridge 6 to the surface of the photoreceptor drum 2 at the locations having the electrostatic charges. Finally, at the position d, the toner on the surface of the photoreceptor drum 2 is held against the paper sheet 10 as it passes and is attracted to corresponding locations on the paper sheet 10. The resulting toner image on the paper sheet 10 is fixed by fusing, thereby completing the printing operation. For a subsequent printing operation, the toner remaining on the photoreceptor drum 2 is removed by cleaning and erasure.

As described above, the light beam from the exposure light source 4 changes the electrostatic charges on the surface of the photoreceptor drum 2 according to the image to be printed. Two types of exposure light sources for this purpose are conventional. One type is a light emitting diode (LED) printing head (LPH) and the other type is a laser scanning printing head. FIG. 2 is a schematic view showing an exposure process using a laser scanning head. As shown, a charged surface 2a of a photoreceptor drum 2 is exposed by a laser scanning head 4a. Since such laser scanning heads are large and expensive, in general, only a single laser beam is used for scanning. In FIG. 2, all the pixels in the image to be printed are scanned sequentially by the laser scanning head 4a. That is, the exposure by the laser scanning head is conducted pixel by pixel. On the other hand, FIG. 3 is a schematic view showing an exposure process using an LPH. As shown, an elongated LPH 4b comprises a plurality of LEDs each corresponding to a pixel in a scanning line on a surface 2a of a photoreceptor drum 2, and thus the LPH 4b corresponds to a complete scanning line. For a resolution of 300 dpi (dots per inch) using a paper sheet of letter size with a width of 8.5 inches, the LPH contains about 2550 LEDs. The exposure by the LPH is conducted line by line in contrast to the pixel-by-pixel exposure with the laser scanning head. This difference influences the exposure processing of images containing a plurality of gray levels.

Different gray levels in an image can be represented by various number combinations. For example, four gray levels can be represented by numerals 0, 1, 2 and 3, or binary bits 00, 01, 10 and 11. In gray level exposure, the charges remaining on a photoreceptor drum after exposure are not uniform due to the different exposure levels so that the amount of toner attracted to a sheet to be printed is not uniform. For the laser scanning head, exposure times are controlled by pulse widths to achieve different gray levels. As shown in FIG. 4, pulses of different widths correspond to gray levels "3", "2", "1" and "0". If the maximum pulse width is "T", "T" corresponds to gray level "3". The pulse width for gray level "2" is smaller than that for gray level "3", and two possible pulse timings are shown in FIG. 4. The pulse width for gray level "1" is smaller than that for gray level "2". For the gray level "0" there is no exposure. The different exposure times vary the residual charge levels. On the other hand, it is extremely difficult for an LPH to use pulse width modulation to provide different gray levels since it is complicated to control the exposure time of each LED of the LPH individually. Therefore, multiple exposures are used to provide gray levels. For example, two exposures can produce 4 gray levels.

As described above, two or more exposures are employed to achieve different gray levels for an LPH. However, that method has the following disadvantage. During exposure, data for the image to be printed are stored in an exposure data memory. Then the image data are read from the memory and sent to each LED of the LPH. If multiple exposures are necessary for a single image pixel to provide a desired gray level, which means that access to the memory is needed for each exposure, then repeated accesses to the memory is needed for that pixel, thereby lengthening the data access time. In general, the access time needed for an LPH increases with the number of exposures, and it is longer than the access time needed for a laser scanning head using pulse width exposure control.

To overcome the problem resulting from the need for multiple data access, a design using a single bit for each access has been considered. However, it is impossible to overcome the problem in this way with a conventional memory arrangement. For example, for 2-bit gray levels, each time when a numeral representing a gray level of a pixel is to be read, two bits must be read at the same time. Reading of the useless bit cannot be avoided with the conventional memory arrangement. That is, when data at a selected address is being read with the conventional arrangement, it is impossible to further select an odd bit or an even bit.

SUMMARY OF THE INVENTION

Accordingly, in view of the foregoing, it is an object of the present invention to provide a memory arrangement for exposure data for multiple exposures which overcomes disadvantages of the prior art.

Another object of the invention is to provide a memory arrangement in which repetition of access to data is decreased during multiple exposures by an LPH, thereby shortening the time needed for the exposures.

A further object of the present invention is to provide a method for processing multiple exposures using a memory arrangement according to the present invention.

These and other objects of the invention are attained by providing a memory arrangement for exposure data used in multiple exposures for storing gray level data in which the memory arrangement has a first memory for storing a high bit portion of the gray level data and reading out the high bit portion in a first exposure and a second memory for storing the low bit portion of the gray level data and reading out the low bit portion in the first exposure. The first memory and the second memory can be controlled by separate chip selection control signals. The memories are further provided with two separate bit part enable signals, respectively to control accesses to a high bit part and a low bit part in each memory unit. During writing, the gray level data are written by first using the high bit part enable signal of the first memory and the low bit part enable signal of the second memory and then using the low bit part enable signal of the first memory and the high bit part enable signal of the second memory, to avoid conflict between data lines. During reading, the high bit part and the low bit part are exchanged before they are read out.

BRIEF DESCRIPTION OF THE DRAWINGS

Further objects, features and advantages of the present invention will become apparent to those skilled in the art upon consideration of the following description of the preferred embodiments of the present invention taken in conjunction with the accompanying drawings, in which:

FIG. 1 is a schematic view showing a typical embodiment of a printing mechanism in an electrophotographic arrangement;

FIG. 2 is a schematic view showing an exposure process using a laser scanning head;

FIG. 3 is a schematic view showing an exposure process using an LPH;

FIG. 4 is a graphical illustration showing several waveforms utilized to control exposures to produce various gray levels by a laser scanning head;

DETAILED DESCRIPTION OF PREFERRED EMBODIMENT

The following is a description of the preferred embodiments of the present invention with reference to the accompanying drawings.

Figure 5:
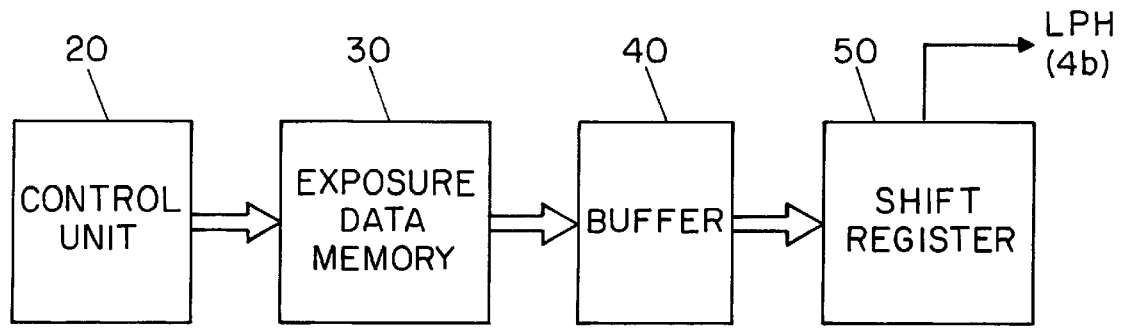
FIG. 5 is a schematic block diagram showing a typical embodiment of an exposure data memory arrangement according to the present invention.

A memory arrangement for storing exposure data and a method for processing multiple exposures used with the memory arrangement will now be described. FIG. 5 is a view showing an exposure data memory arrangement according to the present invention. As shown in FIG. 5, image data for printing an image are supplied from a control unit 20 and stored in an exposure data memory arrangement 30 containing a plurality of memory units, each unit having 16 or 32 bits. During exposure, the image data are transmitted from the exposure data memory 30 to a buffer 40 for buffering data output and sequentially sending the image data for each pixel to a shift register 50 and then to an LPH 4b. In accordance with the prior art, all of the exposure data in an exposure data memory are read out every time an exposure is carried out, so that the total read time is long. In contrast, the problem of repetition of data accesses can be reduced according to the present invention.

FIRST EMBODIMENT

In accordance with the first embodiment of the invention, 2 bits (representing two exposures) are used to represent 4 gray levels corresponding to four gray level image data 00 (level 0), 01 (level 1), 10 (level 2) and 11 (level 3). In the first exposure, the least significant bit (LSB) of each of the image data is utilized, while in the second exposure, the most significant bit (MSB) of each of the image data is utilized. If these two exposures have different values, 4 gray levels of 00, 01, 10, 11 can be produced. Even if gray level 11 is not used, there are still 3 gray levels.

Figure 6:
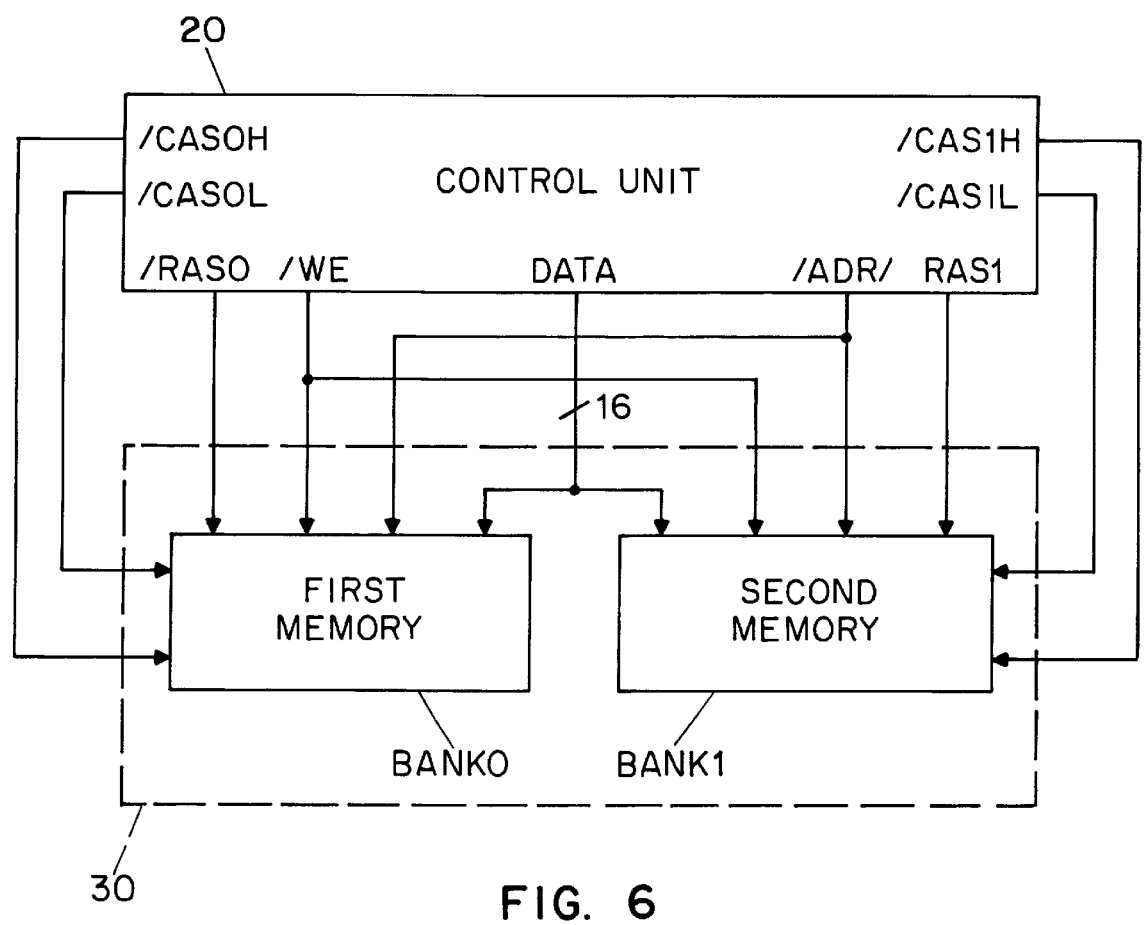
FIG. 6 is a schematic block diagram showing a typical arrangement for controlling exposure data memories according to a first embodiment of the present invention.

FIG. 6 is a block diagram showing an arrangement for controlling the exposure data memory 30 in the first embodiment. As shown in FIG. 6, the exposure data memory 30 is divided into to separate blocks, i.e., a first memory BANK0 and a second memory BANK1. Each of the first memory BANK0 and the second memory BANK1 consists of a plurality of memory units. In the present embodiment, each of those memory units is of 16 bits. The first memory BANK0 is used for storing a high bit of a gray level for each dot, and the second memory BANK1 is used for storing a low bit thereof. Further, as shown in FIG. 6, the first memory BANK0 and the second memory BANK1 are separately controlled by selection control signals. The control unit 21 on one hand provides a gray level data signal DATA to the first memory BANK0 and the second memory BANK1, and on the other hand transmits a high bit portion of the gray level data signal DATA to the first memory BANK0 and a low bit portion thereof to the second memory BANK1 by the selection control signals.

Among the selection control signals sent from the control unit 20, are a write enable signal /WE and an address signal ADR which are transmitted to both the first memory BANK0 and the second memory BANK1, and other selection control signals which are delivered only to the first memory BANK0 (/RAS0, /CAS0L, /CAS0H) and only to the second memory BANK1 (/RAS1, /CAS1L, /CAS1H), where the sign "/" means active low. Signals /RAS0 and /RAS1 are row address strobe signals for the corresponding blocks, and in the present embodiment, they are used as chip selection control signals for determining if the corresponding blocks are active. That is, the corresponding blocks can be accessed at logic value "0". Signals /CAS0H and /CAS1H are column address strobe signals for high bytes, and signals /CAS0L and /CAS1L are column address strobe signals for low bytes. In the present embodiment, they are used as enable signals for high/low bytes for determining if the high byte and low byte of each memory unit in the corresponding blocks can be accessed. For example, the signal /CAS0L is used to determine if the low byte of each memory unit in the first memory BANK0 can be accessed. When it is logic "0", the low byte can be accessed, and when it is logic "1", the low byte cannot be accessed. In association with the signals mentioned above, the control unit 20 can simultaneously send the high bit and the low bit of each gray level data signal to the first memory BANK0 and the second memory BANK1, respectively.

The control of the first memory BANK0 and the second memory BANK1 can be divided into two stages. At the first stage, called the writing operation, the high bits of each gray level data signal in the image data are written in the first memory BANK0, and the low bits thereof are written in the second memory BANK1. At the second stage, called the reading operation, the stored data are read out and exposures are carried out twice. The writing operation and the reading operation are described in detail as follows.

Writing Operation

Figure 7:
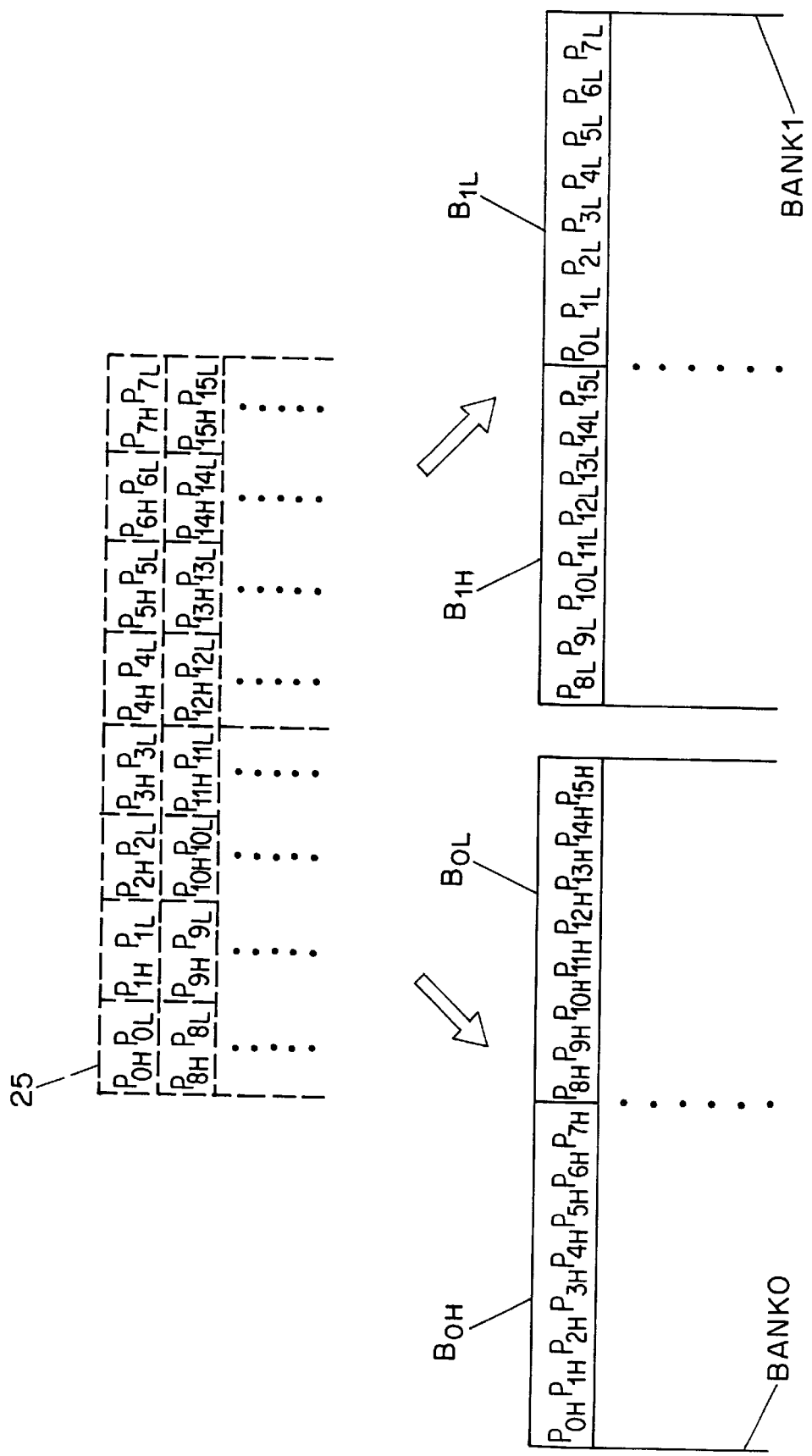
FIG. 7 is a schematic diagram showing how gray level data is written in the exposure data memories according to the first embodiment of the present invention.

In the writing operation, the gray level data are transmitted through a 16-bit data line DATA by the control unit 20, and the 16-bit data transmitted each time comprises gray level data corresponding to 8 pixels. The high and low bytes are interleavedly written to avoid any conflicts on the data bus. FIG. 7 shows the steps of writing the gray level data in the first memory BANK0 and the second memory BANK1, respectively. The gray level data signal 25 in FIG. 7 comprises data for 16 pixels, each comprising two bits. For example, the high and low bits of dot No. 6 are $P_{6H}$ and $P_{6L}$. The first word of the gray level data signal 25 comprises pixels numbered 0 to 7. The control unit 20 divides this word into a high byte ($P_{0H}P_{1H}P_{2H}P_{3H}P_{4H}P_{5H}P_{6H}P_{7H}$) and a low byte ($P_{0L}P_{1L}P_{2L}P_{3L}P_{4L}P_{5L}P_{6L}P_{7L}$). During writing, the control unit 20 simultaneously transmits the high byte and the low byte to a high byte area $B_{0H}$ of the first memory BANK0 and a low byte area $B_{1L}$ of the second memory BANK1, respectively. Then, the control unit 20 divides the next word into a high byte ($P_{8H}P_{9H}P_{10H}P_{11H}P_{12H}P_{13H}P_{14H}P_{15H}$) and a low byte ($P_{8L}P_{9L}P_{10L}P_{11L}P_{12L}P_{13L}P_{14L}P_{15L}$). In addition, the high byte and the low byte are simultaneously transmitted to a low byte area $B_{0L}$ of the first memory BANK0 and a high byte area $B_{1H}$ of the second memory BANK1. The above operations are repeated for the subsequent data, such that high and low bits of each gray level data can be written in different memories, as shown in FIG. 7.

The control operation described above can be understood with reference to Table 1.

TABLE 1

| Writing Operation | First Memory BANK0 /RAS0 = 0 | | Second Memory BANK1 /RAS1 = 0 | |
|---|---|---|---|---|
| Pixel No. ADR | /CAS0H | /CAS0L | /CAS1H | /CAS1L |
| 0–7    0 | 0 | 1 | 1 | 0 |
| 8–15   0 | 1 | 0 | 0 | 1 |

TABLE 1-continued

| Writing Operation | First Memory BANK0 /RAS0 = 0 | | Second Memory BANK1 /RAS1 = 0 | |
|---|---|---|---|---|
| Pixel No. ADR | /CAS0H | /CAS0L | /CAS1H | /CAS1L |
| 16–23  1 | 0 | 1 | 1 | 0 |
| 24–31  1 | 1 | 0 | 0 | 1 |

Both /RAS0 and /RAS1 are set to be logic "0" since the first memory BANK0 and the second memory BANK1 are accessed at the same time. When writing of pixels Nos. 0–7 is carried out, the address signal ADR is first set to be logic "0", which means that address 0 in either block is accessed. Next, the signals /CAS0H and /CAS1L are set to be logic "0", and the high byte area of the first memory BANK0 and the low byte area of the second memory BANK1 are selected. When writing of pixels Nos. 8–15 is carried out, the address signal ADR is set to be logic "0", which means that address 0 is still accessed. Next, the signals /CAS0L and /CAS1H are set to be logic "0", and the low byte area of the first memory BANK0 and the high byte area of the second memory BANK1 are selected. For pixels Nos. 16–23 and pixels Nos. 24–31, the only difference is setting of the address signal ADR. In these cases, the address signal ADR is logic "1", which means that the memory unit of address 1 is accessed. In this way, all of the image data can be loaded into the first memory BANK0 and the second memory BANK1.

In the writing operation, all the high bits of the gray level data are stored in the first memory BANK0, while all the low bits are stored in the second memory BANK1. Therefore, the data in the memories can be separately outputted for two exposures. However, it should be noted that in the second memory BANK1, the bits stored in the areas $B_{1H}$ and $B_{1L}$ must be inversely outputted. To this end, the high and low bytes can be exchanged either in the second memory or during output. In the present embodiment, they are exchanged during output.

Reading Operation

As described previously, two exposures can be achieved by the aid of the high and low bits of the gray level data. In the present embodiment, the low bit portion is used for the first exposure, while the high bit portion is used for the second exposure. To provide four gray levels, the first exposure is conducted for gray level data levels "01" and "11", and the second exposure is conducted for gray level data levels "10" and "11". In other words, the data in the second memory BANK1 is for the first exposure, and the data in the first memory BANK0 is for the second exposure. Tables 2 and 3 show logic values of the selection control signals in the first and second exposures.

TABLE 2

| First Exposure. | First Memory BANK0 /RAS0 = 1 | | Second Memory BANK1 /RAS1 = 0 | |
|---|---|---|---|---|
| Pixel No. ADR | /CAS0H | /CAS0L | /CAS1H | /CAS1L |
| 0–15   0 | 1 | 1 | 0 | 0 |
| 16–31  1 | 1 | 1 | 0 | 0 |
| 32–47  2 | 1 | 1 | 0 | 0 |
| 48–63  3 | 1 | 1 | 0 | 0 |

TABLE 3

| Second Exposure | | First Memory BANK0 /RAS0 = 0 | | Second Memory BANK1 /RAS1 = 1 | |
|---|---|---|---|---|---|
| Pixel No. | ADR | /CAS0H | /CAS0L | /CAS1H | /CAS1L |
| 0–7 | 0 | 0 | 0 | 1 | 1 |
| 8–15 | 1 | 0 | 0 | 1 | 1 |
| 16–23 | 2 | 0 | 0 | 1 | 1 |
| 24–31 | 3 | 0 | 0 | 1 | 1 |

In the first exposure shown in Table 2, the data in the first memory BANK0 is unnecessary, and thus the signals /RAS0, /CAS0L and /CAS0H are logic "1". Meantime, the data in the second memory BANK1 are sequentially read out, and the selection control signals are logic "1". In contrast, in the second exposure, all the selection control signals for the first memory BANK0 are logic "0", while all the selection signals for the second memory BANK1 are logic "1". The memory units are sequentially selected by the address signal ADR.

Figure 8A:
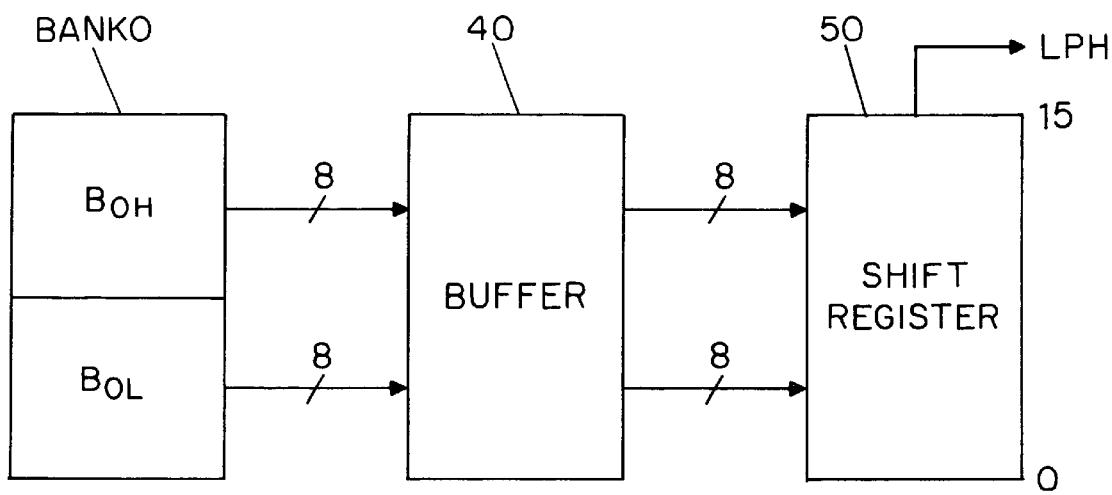
FIGS. 8A and 8B are schematic diagrams illustrating the reading out of exposure data from the first memory and the second memory according to the first embodiment of the present invention.
Figure 8B:
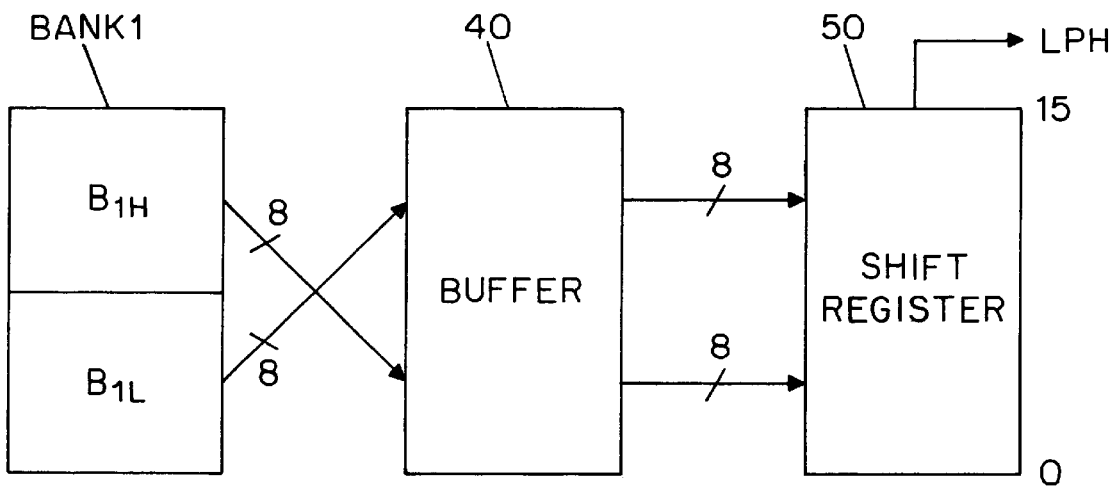

As mentioned above, it is necessary to provide byte exchange in the second memory BANK1. According to the present embodiment, this is accomplished during the reading operation. FIGS. 8A and 8B show outputs of the exposure data from the first memory BANK0 and the second memory BANK1, respectively. In FIG. 8A, the data are read out in normal sequence from the first memory BANK0 to a buffer 40 and are then passed to a shift register 50. In FIG. 8B, since byte inversion in the second memory BANK1 is necessary, data in the low byte area $B_{1L}$ is sent to a high bit area of the buffer 40 and data in the high byte area $B_{1H}$ is sent to a low bit area of the buffer 40.

As understood from the writing operation and the reading operation explained above, in one of those operations, data is accessed in units of 16 bits. Further, no replicated reading operation is needed for the same data. Therefore, the reading speed according to the present embodiment is faster than that for the conventional multiple exposure processes, and is equivalent to the reading speed for a general laser scanning head.

Figure 9:
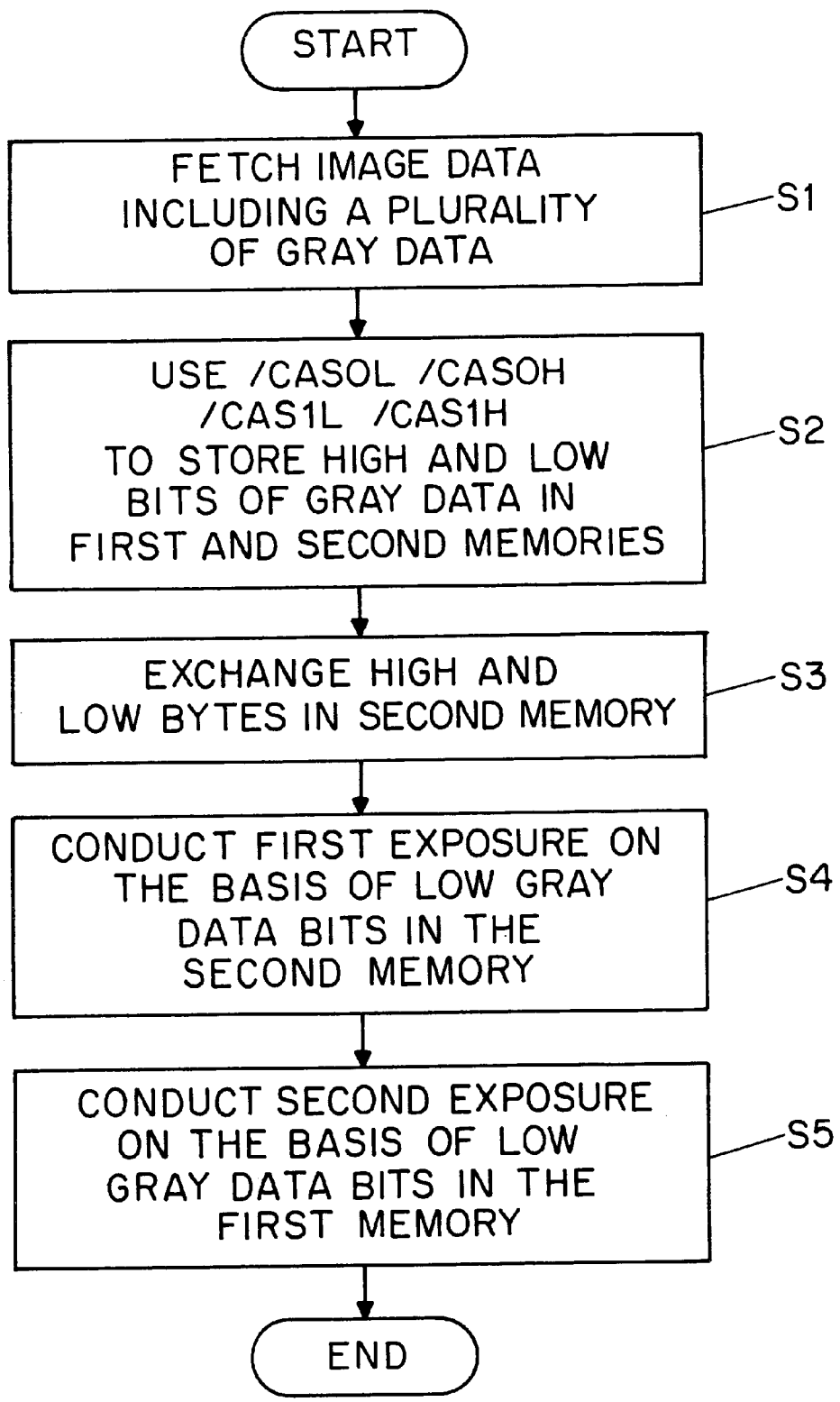
FIG. 9 is a flow chart showing the steps used in multiple exposure processes according to the first embodiment of the present invention.

FIG. 9 is a flowchart of the multiple exposure processes used with the above memory arrangement according to the first embodiment. First, an image data signal comprising a plurality of gray level data is fetched (Step S1). The control unit 20 separates high bit data and low bit data in each of the gray level data signals. Next, the high and low bit data are stored in the first and second memories, respectively, by the selection control signals /CAS0L, /CAS0H, /CAS1L and /CAS1H (Step S2). As described above, the data are written in the corresponding memories with a set of the signals /CAS0L and /CAS1H and another set of the signals /CAS0H and /CAS1L. In data reading, the high and low bytes in the second memory are exchanged first (Step S3), and then the first exposure is conducted on the basis of the low bits of the gray level data in the second memory (Step S4). Finally, the second exposure is conducted on the basis of the low bits of the gray level data in the first memory (Step S5).

Although 16 bits are used as length of each memory unit in the present embodiment, 32 bits or other lengths can be used instead. Further, while the low bit portion is used for the first exposure, the high bit portion can also be used for the first exposure and then the low bit portion is used for the second exposure.

SECOND EMBODIMENT

The difference between this embodiment and the first embodiment is in the number of exposures. In the first embodiment, exposure is conducted twice to achieve 3 or 4 gray levels. In the case of 4 gray levels, it is assumed that two exposures produce the gray level "11", i.e., the exposures are linearly superimposed. However, this assumption does not apply to all kinds of photoreceptor drums. If the exposures are not linearly superimposed when 4 gray levels are needed, this embodiment is useful.

Figure 10:
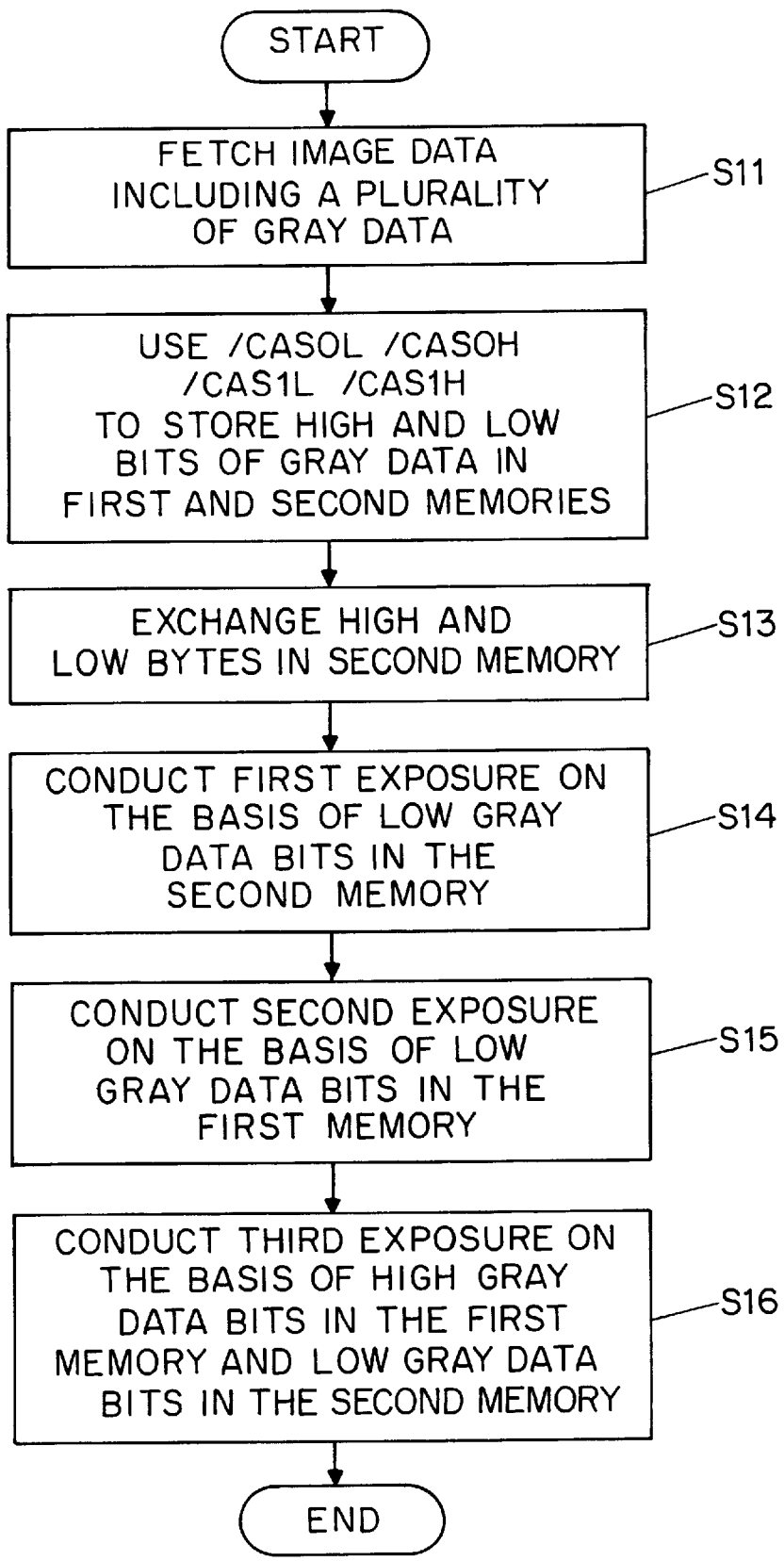
FIG. 10 is a flow chart showing the steps used in multiple exposure processes according to a second embodiment of the present invention.

The memory structure for the exposure data of the present embodiment is the same as that of the first embodiment, but the exposure steps are different. FIG. 10 is a flowchart showing the exposure steps according to the present embodiment, in which steps S11 to S15 thereof are the same as steps S1 to S5 of the first embodiment and a third exposure is added (step S16) to compensate exposure amount for the gray level "11". Therefore, it is necessary to determine which pixels have the gray level "11". The amount of exposure required for compensation is determined by the characteristics of the LPH and photoreceptor drum. The selection control signals for the third exposure are shown in Table 4.

TABLE 4

| Third Exposure | | First Memory BANK0 /RAS0 = 0 | | Second Memory BANK1 /RAS1 = 0 | |
|---|---|---|---|---|---|
| Pixel No. | ADR | /CAS0H | /CAS0L | /CAS1H | /CAS1L |
| 0–7 | 0 | 0 | 1 | 1 | 0 |
| 8–15 | 0 | 1 | 0 | 0 | 1 |
| 16–23 | 1 | 0 | 1 | 1 | 0 |
| 24–31 | 1 | 1 | 0 | 0 | 1 |

Tables 5 and 6 show differences in exposure between the prior art and the embodiment, where X, Y and Z represent three different exposure amounts.

TABLE 5

| Gray Level | Code | First Exposure | Second Exposure | Third Exposure |
|---|---|---|---|---|
| 0 | 0 0 | 0 | 0 | 0 |
| 1 | 0 1 | X | 0 | 0 |
| 2 | 1 0 | 0 | Y | 0 |
| 3 | 1 1 | 0 | 0 | Z |
| Number of Bits to Be Read | | 2 bits | 2 bits | 2 bits |

TABLE 6

| Gray Level | Code | First Exposure | Second Exposure | Third Exposure |
|---|---|---|---|---|
| 0 | 0 0 | 0 | 0 | 0 |
| 1 | 0 1 | X | 0 | 0 |
| 2 | 1 0 | 0 | Y | 0 |
| 3 | 1 1 | X | Y | Z |
| Number of Bits to Be Read | | 1 bit | 1 bit | 2 bits |

Table 5 shows the prior art exposures and Table 6 shows the exposures used in the invention. As shown in these tables, according to the prior art, both bits need to be read every time when any exposure is conducted since the three levels "01", "10" and "11" should be determined. In the present embodiment, both bits need to be read only for the third exposure, and only a single bit is necessary for the other exposures.

In the foregoing embodiments, the present invention is described with reference to 2-bit gray level data. However, the present invention is not limited to the 2-bit gray level data, and more bits can be utilized instead. For example, a 4-bit gray level signal can be divided into a high bit portion (including 2 bits) and a low bit portion (including 2 bits). By the control procedure of the first embodiment, the high bit portion can be written in the first memory BANK0 and the low bit portion can be written in the second memory BANK1. The exposure is then carried out with reference to the high and low bit portions with respect to each bit.

According to the first and second embodiments, the exposure data access time can be effectively reduced. One half of the access time is saved in the first embodiment, and one third of the access time is saved in the second embodiment. In practice, the exposure data memory can be implemented by a general DRAM or an embedded DRAM.

THIRD EMBODIMENT

While in the first and second embodiments, each gray level has 2 bits and each memory unit has a length of 16 bits, the technique disclosed in the present invention is also applicable to gray level and memory units of different lengths. In the third embodiment, a memory having memory units of 32 bits is provided, and each gray level uses 4 exposure bits.

Figure 11:
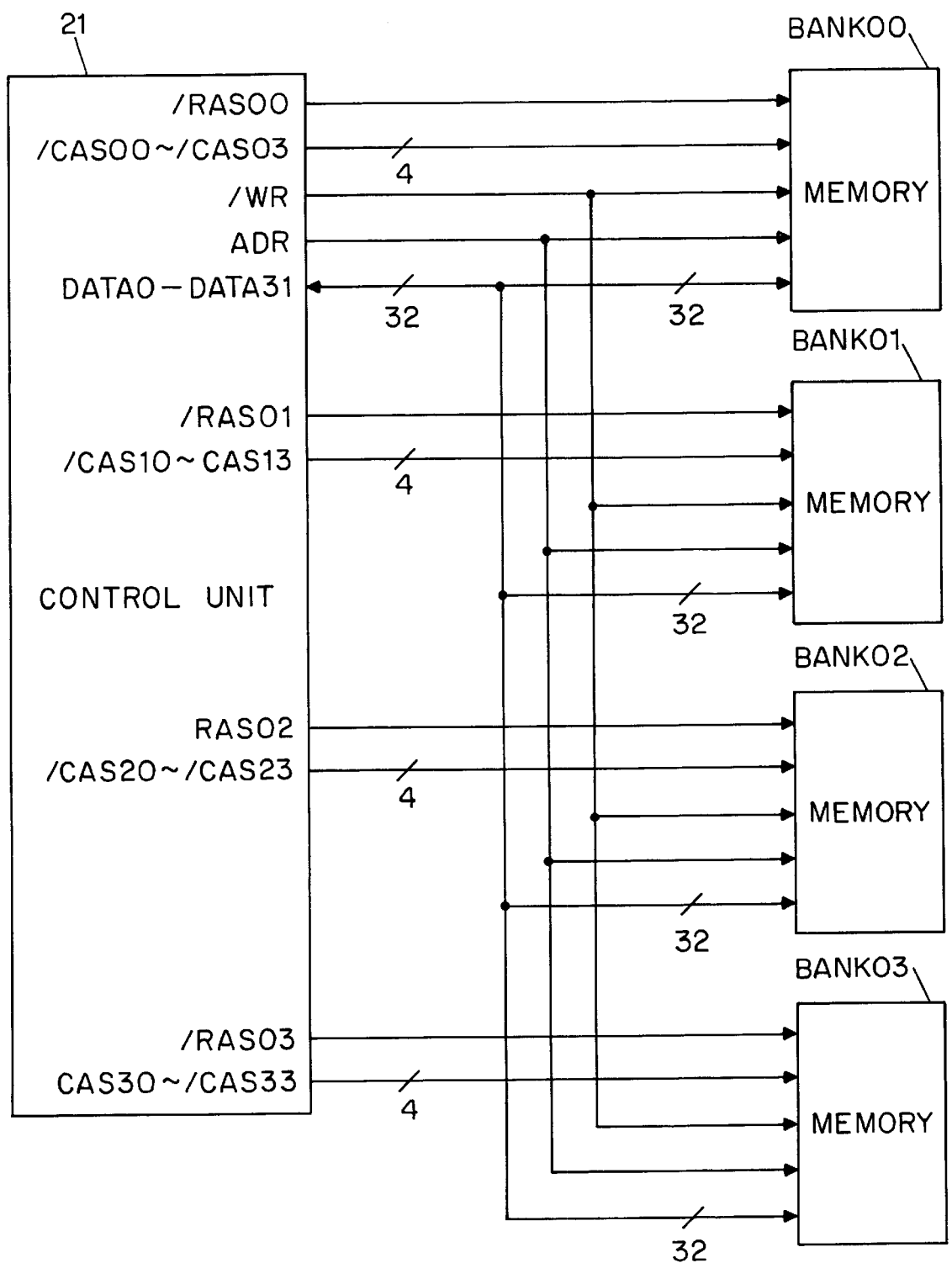
FIG. 11 is a schematic block diagram showing an arrangement for the control of exposure data memories according to a third embodiment of the present invention.

In the present invention, an exposure data memory is provided for each exposure bit of the gray level data, and thus four memories BANK00, BANK01, BAN02 and BANK03 are provided for storing 4 exposure bits for each gray level. FIG. 11 is a block diagram showing an arrangement for controlling the memories according to the present embodiment. In that arrangement, a control unit 21 transmits various control signals, address signals and data signals to the respective memories (BANK00–BANK03). ADR stands for an address signal for designating an address of the memory unit to be accessed, and /WR stands for a write enable signal.

Similar to the first embodiment, the control unit 21 transmits row address strobe signals /RAS00, /RAS01, /RAS02 and /RAS03 to the corresponding memories BANK00, BANK01, BANK02 and BANK03. When a row address strobe signal is logic "0", the corresponding memory is enabled so that data can be read or written. Further, in the present embodiment, each memory unit has a width of 32 bits and is divided into 4 bytes each consisting of 8 bits. The control unit 21 generates column address strobe signals /CASm0–/CASm3 for corresponding bytes of the respective memory where m represents the corresponding memory, in order to access the bytes. As shown, signals /CAS00–/CAS03 are used for accessing the corresponding bytes in the memory BANK00, signals /CAS10–/CAS13 are used for accessing the corresponding bytes in the memory BANK01, signals /CAS20–/CAS23 are used for accessing the corresponding bytes in the memory BANK02, and signals /CAS30–/CAS33 are used for accessing the respective bytes in the memory BANK03.

When a gray level data signal is received in the control unit 21, it is divided into 4 portions and each portion is combined with corresponding portions of other gray level data signals, as shown in the first embodiment in which high bit data and low bit data are separated. For example, when eight gray level data signals of $(P_{03}P_{02}P_{01}P_{00})$, $(P_{13}P_{12}P_{11}P_{10})$, $(P_{23}P_{22}P_{21}P_{20})$, $(P_{33}P_{32}P_{31}P_{30})$, $(P_{43}P_{42}P_{41}P_{40})$, $(P_{53}P_{52}P_{51}P_{50})$, $(P_{63}P_{62}P_{61}P_{60})$ and $(P_{73}P_{72}P_{71}P_{70})$ are received in the control unit 21, thirty-two exposure bits are included. The exposure bits of the same position are combined to form a new byte, i.e., $(P_{00}P_{10}P_{20}P_{30}P_{40}P_{50}P_{60}P_{70})$, $(P_{01}P_{11}P_{21}P_{31}P_{41}P_{51}P_{61}P_{71})$, $(P_{02}P_{12}P_{22}P_{32}P_{42}P_{52}P_{62}P_{72})$ and $(P_{03}P_{13}P_{23}P_{33}P_{43}P_{53}P_{63}P_{73})$. These bytes can be sent to the corresponding memories by signal data DATA0–DATA31 under the control of the column address strobe signals, so that conflicts on data lines can be avoided.

Hereinafter, data reading and writing (exposure) operations are explained with reference to the foregoing memory control. Control of data writing and reading is basically the same as that in the first embodiment. Table 7 shows states of respective control signals in the writing operation while signal /RW is logic "0".

TABLE 7

| Writing Operation | | /RAS03 = 0 | | | | /RAS02 = 0 | | | | /RAS01 = 0 | | | | /RAS00 = 0 | | | |
|---|---|---|---|---|---|---|---|---|---|---|---|---|---|---|---|---|---|
| | | /CAS3n | | | | /RAS2n | | | | /RAS1n | | | | /CAS0n | | | |
| Pixel | ADR n = | 3 | 2 | 1 | 0 | 3 | 2 | 1 | 0 | 3 | 2 | 1 | 0 | 3 | 2 | 1 | 0 |
| 0–7 | 0 | 0 | 1 | 1 | 1 | 1 | 0 | 1 | 1 | 1 | 1 | 0 | 1 | 1 | 1 | 1 | 0 |
| 8–15 | 0 | 1 | 0 | 1 | 1 | 1 | 1 | 0 | 1 | 1 | 1 | 1 | 0 | 0 | 1 | 1 | 1 |
| 16–23 | 0 | 1 | 1 | 0 | 1 | 1 | 1 | 1 | 0 | 0 | 1 | 1 | 1 | 1 | 0 | 1 | 1 |
| 24–31 | 0 | 1 | 1 | 1 | 0 | 0 | 1 | 1 | 1 | 1 | 0 | 1 | 1 | 1 | 1 | 0 | 1 |

When gray level data for corresponding pixels 0–7 are written, signal /RW is logic "0", and ADR represents address 0. All row address strobe signals /RAS00–/RAS03 are logic "0", so that data can be written in all the memories. Next, signals /CAS33, /CAS22, /CAS11 and /CAS00 become logic "0", which stands for the enable state. That is, the byte consisting of every exposure bit 3 (MSB) is written to byte 3 of a memory unit having address 0 in the memory BANK03. The byte consisting of every exposure bit 2 is written to byte 2 of a memory unit having address 0 in the memory BANK02. The byte consisting of every exposure bit 1 is written to byte 1 of a memory unit having address 0 in the memory BANK01. The byte consisting of every exposure bit 0 (LSB) is written to byte 0 of a memory unit having address 0 in the memory BANK00. Using this procedure, data for pixels 8–15, 16–23 and 24–31 are interleavedly written into other bytes of the memory units each having address 0 in the memories, respectively. The above procedures are repeated in order to load all gray level data into other addresses of the memory units.

As shown in Table 7, similar to the first embodiment, the memories BANK02, BANK01 and BANK00 suffer from the problem of byte misplacement. Therefore, the positions of respective bytes in each of the memory units need to be adjusted. For example, in the memory BANK02, bytes 3, 2, 1, and 0 should be changed to bytes 0, 3, 2 and 1.

When gray level data are read out for exposure, as in the first embodiment, exposure is carried out for all data in a corresponding memory. In the present embodiment, exposure is carried out four times in correspondence with memories BANK03, BANK02, BANK01 and BANK00. Tables 8–11 show the logic values of respective selection control signals during the first, second, third and fourth exposures.

TABLE 8

| First Exposure | | /RAS03 = 0 /CAS3n | | | | /RAS02 = 0 /RAS2n | | | | /RAS01 = 0 /RAS1n | | | | /RAS00 = 0 /CAS0n | | | |
|---|---|---|---|---|---|---|---|---|---|---|---|---|---|---|---|---|---|
| Pixel | ADR N = | 3 | 2 | 1 | 0 | 3 | 2 | 1 | 0 | 3 | 2 | 1 | 0 | 3 | 2 | 1 | 0 |
| 0–31 | 0 | 0 | 0 | 0 | 0 | 1 | 1 | 1 | 1 | 1 | 1 | 1 | 1 | 1 | 1 | 1 | 1 |
| 32–63 | 1 | 0 | 0 | 0 | 0 | 1 | 1 | 1 | 1 | 1 | 1 | 1 | 1 | 1 | 1 | 1 | 1 |
| 64–95 | 2 | 0 | 0 | 0 | 0 | 1 | 1 | 1 | 1 | 1 | 1 | 1 | 1 | 1 | 1 | 1 | 1 |
| 96–127 | 3 | 0 | 0 | 0 | 0 | 1 | 1 | 1 | 1 | 1 | 1 | 1 | 1 | 1 | 1 | 1 | 1 |

TABLE 9

| First Exposure | | /RAS03 = 0 /CAS3n | | | | /RAS02 = 0 /RAS2n | | | | /RAS01 = 0 /RAS1n | | | | /RAS00 = 0 /CAS0n | | | |
|---|---|---|---|---|---|---|---|---|---|---|---|---|---|---|---|---|---|
| Pixel | ADR N = | 3 | 2 | 1 | 0 | 3 | 2 | 1 | 0 | 3 | 2 | 1 | 0 | 3 | 2 | 1 | 0 |
| 0–31 | 0 | 1 | 1 | 1 | 1 | 0 | 0 | 0 | 0 | 1 | 1 | 1 | 1 | 1 | 1 | 1 | 1 |
| 32–63 | 1 | 1 | 1 | 1 | 1 | 0 | 0 | 0 | 0 | 1 | 1 | 1 | 1 | 1 | 1 | 1 | 1 |
| 64–95 | 2 | 1 | 1 | 1 | 1 | 0 | 0 | 0 | 0 | 1 | 1 | 1 | 1 | 1 | 1 | 1 | 1 |
| 96–127 | 3 | 1 | 1 | 1 | 1 | 0 | 0 | 0 | 0 | I | 1 | 1 | I | 1 | 1 | 1 | 1 |

TABLE 10

| First Exposure | | /RAS03 = 0 /CAS3n | | | | /RAS02 = 0 /RAS2n | | | | /RAS01 = 0 /RAS1n | | | | /RAS00 = 0 /CAS0n | | | |
|---|---|---|---|---|---|---|---|---|---|---|---|---|---|---|---|---|---|
| Pixel | ADR N = | 3 | 2 | 1 | 0 | 3 | 2 | 1 | 0 | 3 | 2 | 1 | 0 | 3 | 2 | 1 | 0 |
| 0–31 | 0 | 1 | 1 | 1 | 1 | 1 | 1 | 1 | 1 | 0 | 0 | 0 | 0 | 1 | 1 | 1 | 1 |
| 32–63 | 1 | 1 | 1 | 1 | 1 | 1 | 1 | 1 | 1 | 0 | 0 | 0 | 0 | 1 | 1 | 1 | 1 |
| 64–95 | 2 | 1 | 1 | 1 | 1 | 1 | 1 | 1 | 1 | 0 | 0 | 0 | 0 | 1 | 1 | 1 | 1 |
| 96–127 | 3 | 1 | 1 | 1 | 1 | 1 | 1 | 1 | 1 | 0 | 0 | 0 | 0 | 1 | 1 | 1 | 1 |

TABLE 11

| First Exposure | | /RAS03 = 0 /CAS3n | | | | /RAS02 = 0 /RAS2n | | | | /RAS01 = 0 /RAS1n | | | | /RAS00 = 0 /CAS0n | | | |
|---|---|---|---|---|---|---|---|---|---|---|---|---|---|---|---|---|---|
| Pixel | ADR N = | 3 | 2 | 1 | 0 | 3 | 2 | 1 | 0 | 3 | 2 | 1 | 0 | 3 | 2 | 1 | 0 |
| 0–31 | 0 | 1 | 1 | 1 | 1 | 1 | 1 | 1 | 1 | 1 | 1 | 1 | 1 | 0 | 0 | 0 | 0 |
| 32–63 | 1 | 1 | 1 | 1 | 1 | 1 | 1 | 1 | 1 | 1 | 1 | 1 | 1 | 0 | 0 | 0 | 0 |
| 64–95 | 2 | 1 | 1 | 1 | 1 | 1 | 1 | 1 | 1 | 1 | 1 | 1 | 1 | 0 | 0 | 0 | 0 |
| 96–127 | 3 | 1 | 1 | 1 | 1 | 1 | 1 | 1 | 1 | 1 | 1 | 1 | 1 | 0 | 0 | 0 | 0 |

As is clear from Tables 8–11, during each exposure, only data in a single memory are read, and thus time of accessing data is reduced.

While the present invention has been described in conjunction with preferred embodiments thereof, it is evident that many alternatives, modifications and variations will be apparent to those skilled in the art. Accordingly, all such alternatives, modifications and variations are included within the spirit and scope of the invention.

I claim:

1. A memory arrangement for storing gray level data used in multiple exposures for printing an image pixel wherein the data for each gray level includes a high bit portion and a low bit portion comprising:

a first memory for storing the high bit portion of the gray level data and transmitting the high bit portion when a first exposure for an image pixel is carried out; and a second memory for storing the low bit portion of the gray level data and transmitting the low bit portion when a second exposure for the same image pixel is carried out;

wherein the first memory and the second memory are controlled by two separate selection control signals, respectively.

2. A memory arrangement according to claim 1 wherein the data for each of the gray levels comprises a high bit and a low bit.

3. A memory arrangement according to claim 1 wherein a first chip selection control signal for controlling access to the first memory is sent to the first memory and a second chip selection control signal for controlling access to the second memory is sent to the second memory.

4. A memory arrangement according to claim 3 wherein the first chip selection control signal and the second chip selection control signal are Row Address Strobe (RAS) signals.

5. A memory arrangement according to claim 1 wherein each of the first memory and the second memory comprises a plurality of memory units, and each of the memory units stores a plurality of bits divided into a high bit part and a low bit part, and wherein the first memory and the second memory enable access to the corresponding bit parts via a first high bit part enable signal and a first low bit part enable signal and via a second high bit part enable signal and a second low bit part enable signal, respectively, so that, during writing of the gray level data, the high bit portion and the low bit portion thereof are written in the first memory and the second memory by combining the first high bit part enable signal and the second low bit part enable signal and combining of the second high bit part enable signal and the first low bit part enable signal, respectively.

6. A memory arrangement according to claim 5 wherein each of the memory units contains 16 bits divided into a high byte and a low byte.

7. A memory arrangement according to claim 5 wherein each of the memory units stores 32 bits.

8. A memory arrangement according to claim 7 her comprising means coupled to the second memory for exchanging the high bit part and the low bit part stored in each of the memory units in the second memory.

9. A memory arrangement according to claim 5 wherein the enable signals are Column Address Strobe (CAS) signals.

10. A method for processing multiple exposures for printing an image pixel, comprising the steps of:
   fetching image data comprising a plurality of gray level data signals each including a plurality of bits divided into a high bit portion and a low bit portion;
   simultaneously storing the high bit portion and the low bit portion of each of the data for each image pixel gray level in a first memory and a second memory, respectively;
   reading the low bit portion from the second memory during a first exposure for an image pixel; and
   reading the high bit portion from the first memory during a second exposure for the same image pixel.

11. A method for processing multiple exposures according to claim 10 wherein the gray level data signals each comprises two bits divided into a high bit and a low bit stored in the first memory and the second memory, respectively.

12. A method for processing multiple exposures according to claim 11 further comprising the step of reading the high bit from the first memory and the low bit from the second memory during a third exposure for the same image pixel.

13. A method for processing multiple exposures according to claim 10 wherein the storing step comprises the steps of:
   writing the high bit portion and the low bit portion of the gray level data in the high bit part of the memory unit in the first memory and the low bit part of the memory unit in the second memory, respectively, by a high bit part enable signal for the first memory and a low bit part enable signal for the second memory; and
   writing the high bit portion and the low bit portion of the gray level data in the high bit part of the memory unit in the second memory and the low bit part of the memory unit in the first memory, respectively, by a high bit part enable signal for the second memory and a low bit part enable signal for the first memory.

14. A method for processing multiple exposures according to claim 13 further comprising the step of exchanging the high bit part and the low bit part in the memory unit of the second memory during the first exposure.

15. A memory arrangement for storing exposure data used in multiple exposures for printing an image pixel wherein the data for each gray level includes a plurality of exposure bits, comprising:
   a plurality of memories for storing the exposure bits for each of the gray levels, the plurality of memories being controlled by separate selection control signals, respectively, and corresponding bit parts in the plurality of memories being transmitted when each of the multiple exposures for the same image pixel are performed.

16. A memory arrangement according to claim 15 wherein chip selection control signals are used to control accesses to the corresponding memories.

17. A memory arrangement according to claim 16 wherein the chip selection control signals are Row Address Strobe (RAS) signals for the corresponding memories.

18. A memory arrangement according to claim 15 wherein each of the memories comprises a plurality of memory units, and each of the memory units stores a plurality of bit parts each including at least one bit, and wherein the units storing the various bit parts of the memories are enabled simultaneously by bit part enable signals corresponding to the bit parts, respectively, such that the exposure bits of the gray level data are written in the corresponding memories, respectively.

19. A memory arrangement according to claim 18 further comprising means coupled to one of the plurality of memories for positioning the bit parts of the memory units in the memory.

20. A memory arrangement according to claim 18 wherein the enable signals are Column Address Strobe (CAS) signals.

21. A method for processing multiple exposures for printing an image pixel, comprising the steps of:
   fetching image data comprising a plurality of gray level data signals each including a plurality of exposure bits for an image pixel;
   storing the exposures bits for each of the gray levels in corresponding one of a plurality of memories, respectively; and
   sequentially reading the exposure bits stored in the memories during respective exposures for the same image pixel.

22. A method for processing multiple exposures according to claim 21 wherein the storing step comprises simultaneously writing the exposure bits of the gray level data signals in various bit parts of the corresponding memories, respectively, by a plurality of enable signals corresponding to the bit parts.

23. A method for processing multiple exposures according to claim 21 further comprising the step of positioning the bit parts stored in the memory units of a portion of the memories.

* * * * *